United States Patent
Dunsmore

(10) Patent No.: US 8,744,370 B2
(45) Date of Patent: Jun. 3, 2014

(54) SYSTEM FOR CHARACTERIZING MIXER OR CONVERTER RESPONSE

(75) Inventor: Joel P. Dunsmore, Sebastopol, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 368 days.

(21) Appl. No.: 13/110,129

(22) Filed: May 18, 2011

(65) Prior Publication Data

US 2012/0295548 A1 Nov. 22, 2012

(51) Int. Cl.
*H04B 17/00* (2006.01)

(52) U.S. Cl.
USPC .................. 455/67.16; 455/67.11

(58) Field of Classification Search
CPC ..... H04W 16/18; H04W 64/00; H04B 7/0617
USPC ................ 455/41.1, 67.16; 370/480, 442; 375/326; 342/387, 174, 750.3
See application file for complete search history.

(56) References Cited

U.S. PATENT DOCUMENTS

| | | | |
|---|---|---|---|
| 6,184,829 B1 * | 2/2001 | Stilp | 342/387 |
| 6,281,834 B1 * | 8/2001 | Stilp | 342/174 |
| 6,492,944 B1 * | 12/2002 | Stilp | 342/387 |
| 7,339,388 B2 * | 3/2008 | Aghababazadeh et al. | 324/750.3 |
| 7,567,629 B2 * | 7/2009 | Fredriksson | 375/326 |
| 7,668,679 B2 * | 2/2010 | Best | 702/106 |
| 2002/0172223 A1 * | 11/2002 | Stilp | 370/480 |
| 2007/0009066 A1 * | 1/2007 | Fredriksson | 375/326 |
| 2009/0280742 A1 * | 11/2009 | Schantz et al. | 455/41.1 |

OTHER PUBLICATIONS

Gunyan, et al. "Mixer-based, vector-corrected, vector signal/network analyzer offering 300kHz-20GHz bandwidth and traceable phase response," MTT-S IMS Digest, Jun. 2005, p. 1497-1500.
Williams, et al. "Scattering-parameter models and representations for microwave mixers," IEEE Transactions on Microwave Theory and Techniques, vol. 53, No. 1, Jan. 2005, p. 314-321.
Dunsmore, et al. "A novel method for measuring phase and group delay of mixers without a reference mixer," Microwave Measurements Conference (ARFTG) 2010 75th ARFTG, May 2010, p. 1-7.
Bonaguide, "Measure group delay without direct LO access," Microwaves & RF, Nov. 2009, p. 99-102.
Dunsmore, "Novel method for vector mixer characterization and mixer test system vector error correction," Proceedings of the IEEE MIT-S Symposium, Jun. 2002, p. 1833-1836.
Clark, et al. "Network analyzer measurement of frequency-translating devices," Microwave Journal, Nov. 1996, p. 114-126.

\* cited by examiner

*Primary Examiner* — April G Gonzales

(57) ABSTRACT

A network analyzer comprises: a signal source configured to supply an input signal to a device, wherein the device is configured to generate a phase reference signal; a receiver configured to receive the phase reference signal from the device and to measure a phase response of the device according to the phase reference signal; and a calibration component configured to compare the measured phase response of the device with an actual phase response of the device to identify a tracking parameter for the receiver.

18 Claims, 8 Drawing Sheets

SYSTEM FOR CHARACTERIZING MIXER OR CONVERTER RESPONSE

BACKGROUND

Frequency-translation devices (FTDs) such as mixers, converters, and tuners are important components in many radio-frequency (RF) and microwave communication systems. For instance, FTDs are important components of wireless telephones, satellite communication systems, and wireless internet devices, to name but a few.

As communication systems adopt more advanced types of modulation, FTD designs tend to become increasingly complex, and their specifications more demanding. Accordingly, to ensure proper performance, test equipment should be designed to accurately characterize the behavior of these increasingly complex FTDs. In general, an FTD should have substantially linear phase shift and flat group delay across its modulation bandwidths.

FTDs can be difficult to characterize because their input and output frequencies differ. Accordingly, FTDs rely upon different measurement techniques than those used to characterize linear devices such as filters. In addition, many FTDs, such as multi-channel frequency converters, are relied upon to be characterized using several different local oscillator (LO) frequencies and across many different input and output frequency ranges.

A number of techniques have been proposed for characterizing phase and group delay response characteristics of contemporary FTDs. In each of these techniques, an FTD is characterized by comparison with a reference device such as a calibration mixer. Accordingly, these conventional techniques do not provide for direct determination of FTD phase and group delay response characteristics.

In one conventional example, a test system determines the phase response of an FTD by measuring the relative phase responses of three sets of mixer pairs and then solving three resulting equations with three unknowns to determine the phase response of each mixer. This technique, however, is susceptible to mismatch errors introduced by interaction between the various mixers and an intermediate frequency (IF) filter used to select a desired mixing product. This method also relies upon that one of the mixers be reciprocal. Additionally, it does not scale well to frequency converters with multiple conversion stages, because it relies on a reconversion mixer driven with a single LO.

In another conventional example, a test system is first calibrated by placing a calibration mixer with known characteristics into a test channel. Then, an FTD is placed in the test channel and its performance is measured relative to a calibrated reference device in a reference channel. In this example, FTD measurements are limited to a frequency range of the calibration mixer. In addition, the calibration mixer is reciprocal. Because of these limitations, this technique cannot be readily applied to complex converter designs.

In still other examples, two-tone stimuli or modulated-signals are applied to an FTD to determine its phase response characteristics. These examples also rely upon a calibration mixer and are therefore difficult to apply to complex converter designs.

Because of the above limitations, conventional test systems for FTDs can be cumbersome and expensive to use. What is needed, therefore, are a network analysis system and a method of calibrating a network analysis system that overcomes at least the shortcoming described above.

SUMMARY

In accordance with a representative embodiment, a method of calibrating a network analysis system comprising a device measurement path located between a first receiver and a second receiver is disclosed. The method comprises: determining a phase response of the first receiver independent of the second receiver; determining a phase response of the second receiver; and determining a phase tracking response from the phase response of the first receiver and the phase response of the second receiver to establish a calibration of the device measurement path.

In accordance with another representative embodiment, a method of characterizing a phase response of a receiver in a signal processing system is disclosed. The method comprises measuring a phase response of a device using the receiver; and modifying the measured phase response according to an actual phase response of the device to generate a phase tracking parameter of the receiver.

In accordance with another representative embodiment, a network analyzer, comprises: a signal source configured to supply an input signal to a device, wherein the device is configured to generate a phase reference signal; a receiver configured to receive the phase reference signal from the device and to measure a phase response of the device according to the phase reference signal; and a calibration component configured to compare the measured phase response of the device with an actual phase response of the device to identify a tracking parameter for the receiver.

BRIEF DESCRIPTION OF THE DRAWINGS

The present teachings are best understood from the following detailed description when read with the accompanying drawing figures. Wherever practical, like reference numerals refer to like features.

DEFINED TERMINOLOGY

Figure 1:
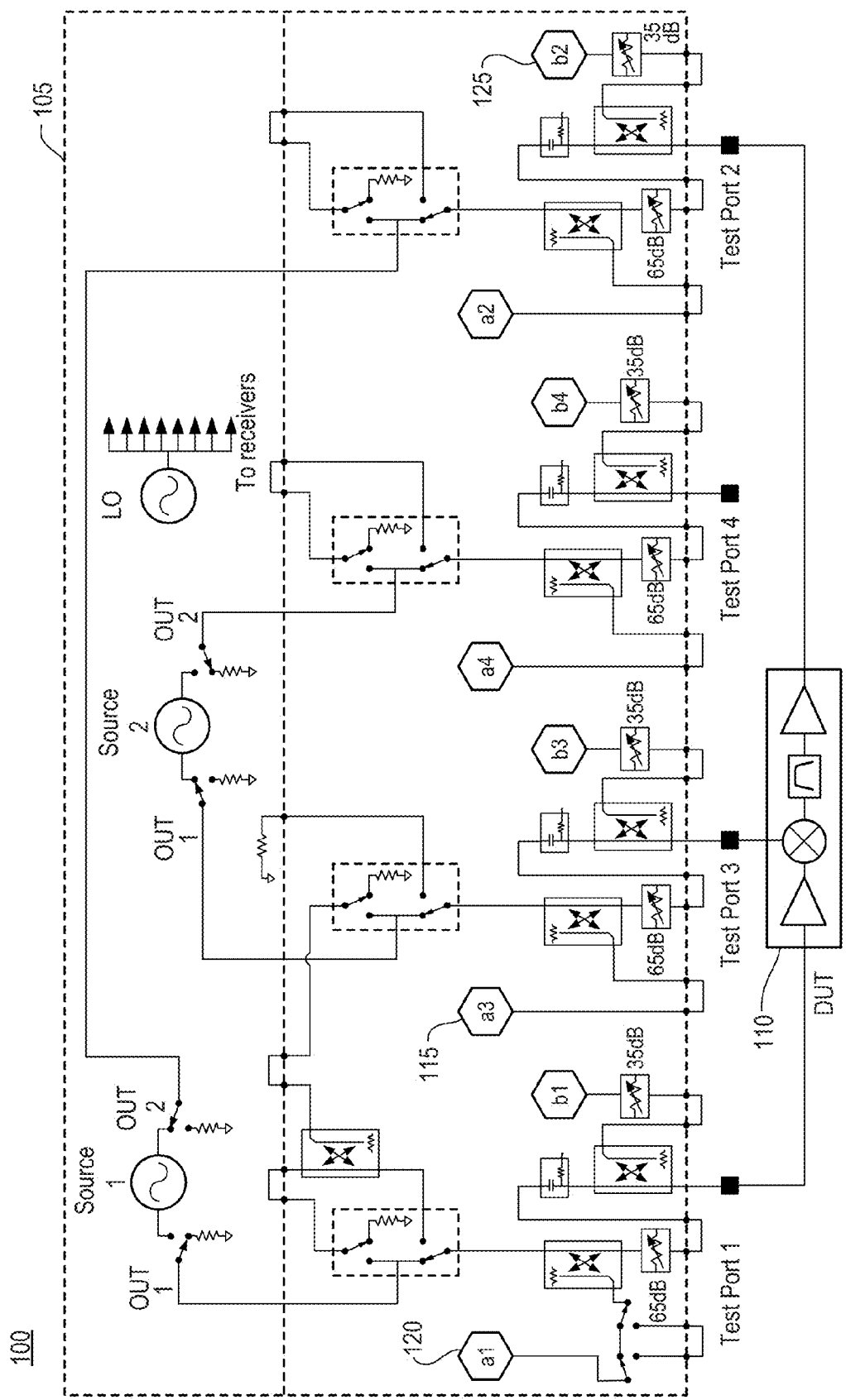
FIG. 1 is a schematic diagram illustrating a measurement system for characterizing a mixer in accordance with a representative embodiment.

It is to be understood that the terminology used herein is for purposes of describing particular embodiments only, and is not intended to be limiting. The defined terms are in addition to the technical and scientific meanings of the defined terms as commonly understood and accepted in the technical field of the present teachings.

As used in the specification and appended claims, the terms 'a', 'an' and 'the' include both singular and plural referents, unless the context clearly dictates otherwise. Thus, for example, 'a device' includes one device and plural devices.

As used in the specification and appended claims, and in addition to their ordinary meanings, the terms 'substantial' or 'substantially' means to with acceptable limits or degree. For example, 'substantially cancelled' means that one skilled in the art would consider the cancellation to be acceptable.

As used in the specification and the appended claims and in addition to its ordinary meaning, the term 'approximately' means to within an acceptable limit or amount to one having ordinary skill in the art. For example, 'approximately the same' means that one of ordinary skill in the art would consider the items being compared to be the same.

DETAILED DESCRIPTION

In the following detailed description, for purposes of explanation and not limitation, representative embodiments disclosing specific details are set forth in order to provide a thorough understanding of the present teachings. Descriptions of known systems, devices, materials, methods of operation and methods of manufacture may be omitted so as to avoid obscuring the description of the example embodiments. Nonetheless, systems, devices, materials and methods that are within the purview of one of ordinary skill in the art may be used in accordance with the representative embodiments.

In general, the disclosed embodiments relate to systems and methods that can be used to characterize the phase or group delay response of a frequency translating device such as a mixer or converter. These embodiments allow a phase response or group delay of a receiver to be characterized independent of other components and using traceable standards.

In certain embodiments, a network analyzer is calibrated by performing phase response measurements, scattering parameter (S-parameter) measurements, and power measurements. In the phase response measurements, an independent phase calibration is performed on input and output receivers of the network analyzer, using a harmonic comb generator as a phase reference device to determine a phase transfer response. The phase response measurements, the S-parameter measurements, and the power measurements are traceable to national standards. Accordingly, the network analyzer can perform a traceable measurement of phase response or group delay of a mixer.

In contrast to conventional systems, the disclosed embodiments allow a system to be calibrated and deployed without the use of a calibration mixer or reference mixer. In addition, the disclosed embodiments can be used over a wide LO frequency range, radio frequency (RF) range, and intermediate frequency (IF) range with a single calibration.

The disclosed embodiments can be applied in a variety of contexts and systems using modulation techniques that benefit from accurate phase response calibration. Examples of such systems include satellite communication equipment, cellular phones, wireless internet devices, and others. For explanation purposes, certain embodiments will be presented in the context of a vector network analyzer (VNA) in which a receiver response is calibrated in order to measure the phase response of a mixer or converter. However, those skilled in the art will recognize that these embodiments can be modified for use in other contexts.

The disclosed embodiments find application in both simple and complex environments. For instance, some embodiments can be used to characterize a simple frequency mixer performing a single frequency conversion without any embedded LO, amplifier, or filter. Meanwhile, some embodiments can be used to characterize a complex frequency converter having one or more frequency mixers, filters, isolators and amplifiers, and at least one embedded LO. In one embodiment, for instance, a satellite communication system sends a variety of channels through the same frequency converter, requiring characterization using many different LO frequencies.

As used in many communication systems, the phase response of a mixer or converter should be linear and the group delay should be relatively flat across the modulation bandwidths, which are becoming increasingly large. Accordingly, certain embodiments are designed to measure the phase response of these devices over a variety of input and output frequency ranges, with a variety of LO frequency drives.

FIG. 1 is a schematic diagram illustrating a measurement system 100 for characterizing a mixer in accordance with a representative embodiment. Measurement system 100 can be used to measure an absolute phase change of a reference or test device across a span of frequency of an input or output signal. Accordingly, it can be used to directly measure the magnitude and phase responses of input and output waves of a mixer.

Referring to FIG. 1, measurement system 100 comprises a VNA 105 connected to a DUT 110. DUT 110 is located in a device measurement path between an "a" receiver 115 and a "b" receiver 125. A reference receiver 120 is located in a reflection path of "a" receiver 115.

VNA 105 has an integrated source and receivers, where both the source and receiver frequencies are determined by a pair of frequency synthesizers. One synthesizer provides a source stimulus signal and the other synthesizer provides a local-oscillator signal for the receivers. A difference between these two signals represents an IF frequency from the receiver, which is sampled by an integrated digital IF.

The synthesizers in VNA 105 use a high-modulus fractional-N synthesizer with an integrated phase accumulator. When programmed to a sweep frequency, the phase accumulator accumulates a certain amount of additional phase each clock cycle to provide a synthesized phase sweep coherent with a system clock. The digital IF and a digital signal processor (DSP) are also locked to the system clock, so each source and LO and the digital IF have a deterministic phase relationship throughout a data sweep acquisition.

With this setup, measurement system 100 is able to measure an absolute phase change across a span of frequency on DUT 110, which can be, for instance, a reference or test mixer. Consequently, measurement system 100 can directly measure magnitude and relative phases of "a" waves input to DUT 110 and "b" waves output by DUT 110.

Figure 2:
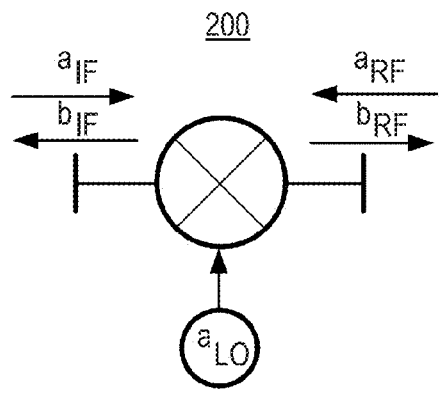
FIG. 2 is a schematic diagram illustrating a model of a frequency mixer in accordance with a representative embodiment.

FIG. 2 is a schematic diagram illustrating a frequency mixer 200 in accordance with a representative embodiment. Frequency mixer 200 is one example of a DUT that can be placed in the device measurement path of measurement system 100.

Referring to FIG. 2, frequency mixer 200 receives input signals in an IF range and performs a frequency conversion to generate output signals in an RF range. Frequency mixer 200 is a two-port system with input port signals $a_{IF}$ and $b_{IF}$ and output port signals $a_{RF}$ and $b_{RF}$. The input/output relationship of frequency mixer 200 can be represented using S-parameters and related error terms corresponding to imperfect conversion loss and phase distortion. For instance, the following equation (1) can be used to represent the input/output relationship between the "b" waves and "a" waves of frequency mixer 200.

$$\begin{bmatrix} b_{IF} \\ b_{RF} \end{bmatrix} = \begin{bmatrix} S_{11}^{IF} & a_{LO} S_{12}^{IF} \\ a_{LO} S_{21}^{IF} & S_{22}^{IF} \end{bmatrix} \begin{bmatrix} a_{IF} \\ a_{RF} \end{bmatrix} \quad (1)$$

The phase of the RF signals depend on both the phase of a LO signal, the phase of the IF signals, and a mismatch term that depends on the reflected RF signal at the output. Accordingly, applying the model of equation (1) to measurement system 100, "b" receiver 125 of FIG. 1 receives a signal $b_{RF}$ defined by the following equation (2).

$$b_{RF} = a_{LO} S_{21}^{IF} \cdot a_{IF} + S_{22}^{RF} \cdot a_{RF} \quad (2)$$

During typical operation, measurement system 100 is able to directly measure $a_{IF}$ and $b_{RF}$. Using the measurements of $b_{RF}$ and $a_{IF}$, the conversion response can be measured from the following equation (3).

$$S_{21} = \frac{(b_{IF}/b_{TR})}{a_{LO} \cdot (a_{IF}/a_{TR})} \cdot \left( \frac{1}{1 - S_{22}^{RF} \cdot \Gamma_L} \right) \left( \frac{1}{1 - S_{11}^{IF} \cdot \Gamma_S} \right) \quad (3)$$

In equation (3), $\Gamma_L$ and $\Gamma_S$ are load match and source match of measurement system 100 respectively, and $b_{TR}$ and $a_{TR}$ are the tracking response errors associated with the "b" receiver 125 and reference receiver 120, respectively.

During typical operation, measurement system 100 corrects tracking response errors $b_{TR}$ and $a_{TR}$ in two parts. In a first part, the magnitude responses of "a" receiver 115 and "b" receiver 125 are separated by measuring their responses independently using a power meter as a reference. In the second part, a calibration mixer is added and the overall response of measurement system 100 is measured. The source and load match of measurement system 100 are measured, and finally a value for the phase of $b_{TR}/a_{TR}$ is computed by solving equation (3), and the amplitude of $b_{TR}/a_{TR}$ is computed independently using the power meter calibrations.

In the above method, the calibration mixer has known values of $b_{IF}/a_{RF}$. Moreover, the calibration mixer is tuned to a particular LO frequency. Other choices of LO frequency require a new calibration and new determination of $b_{IF}/a_{RF}$ of the calibration mixer for that particular frequency. Accordingly, to avoid these problems, an alternative method, illustrated in FIG. 3, performs calibration on measurement system 100 without the use of a calibration mixer.

Figure 3:
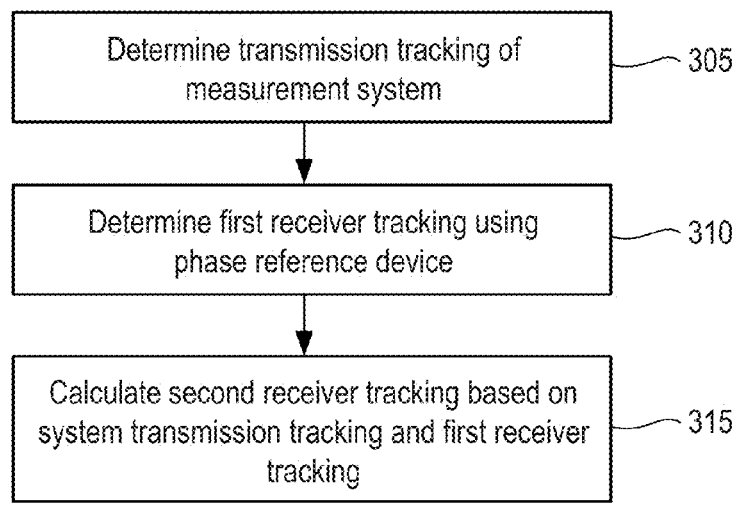
FIG. 3 is a flowchart illustrating a method of calibrating a measurement system in accordance with a representative embodiment.

FIG. 3 illustrates a method of calibrating measurement system 100 in accordance with a representative embodiment. In the description that follows, example method steps will be indicated by parentheses (SXXX) to distinguish them from device or system features.

Referring to FIG. 3, the method first determines a transmission tracking term S21(tracking) of measurement system 100 (S305). The transmission tracking term can be determined in a variety of ways, including conventional techniques such as Agilent's ECAL. The transmission tracking term S21(tracking) is related to tracking terms $a_{TR}$ and $b_{TR}$ associated with "a" receiver 115 and "b" receiver 125 according to the following equation (4), for a case with zero LO offset as in measurement system 100.

$$S_{21}(\text{tracking}) = b_{TR}/a_{TR} \quad (4)$$

According to equation (4), if one of tracking terms $a_{TR}$ or $b_{TR}$ can be determined independently, then the other transmission tracking term can be determined from the one term and the transmission tracking term S21(tracking).

Accordingly, the method next determines tracking term $b_{TR}$ of "b" receiver 125 independent of "a" receiver 115 (S310). This can be accomplished, for instance, using a method described below with reference to FIG. 4. Finally, after determining the tracking term $b_{TR}$, the method determines tracking term $a_{TR}$ from tracking term S21(tracking) and tracking term $b_{TR}$ (S315).

Figure 4:
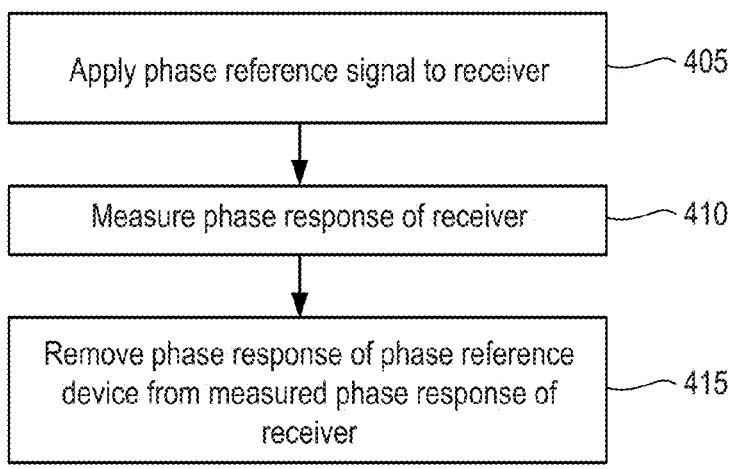
FIG. 4 is a flowchart illustrating a method of independently determining a tracking term of a receiver in accordance with a representative embodiment.

FIG. 4 illustrates a method of determining tracking term $b_{TR}$ of "b" receiver 125 in accordance with a representative embodiment. In the method of FIG. 4, the tracking term $b_{TR}$ is determined independent of any other receiver in measurement system 100.

In the method of FIG. 4, measurement system 100 obtains the phase response of "b" receiver 125 by measuring the phase of a single channel response. To do so, a harmonic comb generator is used as a phase reference device to generate a stimulus signal for measuring the response of "b" receiver 125. The stimulus signal is generated with a known phase in a fundamental and several harmonic frequencies.

The method of FIG. 4 is related to a calibration approach that has been used in the field of non-linear vector network analyzers (NVNA). This approach measures the magnitude and phase of a stimulus signal and its harmonics using a harmonic comb generator as a phase reference device in an additional channel. The method compares the phase of the stimulus signal and its harmonics to the phase of a known comb function generated by the harmonic comb generator, as described, for instance, in "Mixer-based, vector-corrected, vector signal/network analyzer offering 300 kHz-20 GHz bandwidth and traceable phase response," D. Gunyan, J. Scott, MTT-S IMS Digest, 12-17 Jun. 2005. Thus, the waveform of the stimulus signal can be accurately reconstructed from the fundamental and harmonics of the stimulus signal. In this method, the signal reconstruction is facilitated by knowledge of the relative phases of the harmonics of the comb function. The phase of these harmonics can be accurately measured and traced to national standards with relatively small errors. But this method may require that a second phase reference be used on a third receiver to provide a continuous phase standard for the fundamental and each of the harmonics.

Referring to FIG. 4, the method begins by generating a phase reference signal using the phase reference device and applying the phase reference signal to "b" receiver 125 (405). The phase reference device has a measurable phase response $\Phi_{Response}$ over the fundamental and harmonic frequencies of the phase reference signal due to the use of the harmonic comb function.

Next, the method measures a phase response $b_{Response}$ of "b" receiver 125 using the phase reference signal (410). Finally, the phase response of the phase reference device is removed from the measured phase response $b_{Response}$ of "b" receiver 125 to produce the tracking term $b_{TR}$ (415). This is accomplished by dividing the measured phase response $b_{Response}$ by the phase response $\Phi_{Response}$ of the phase reference device as in the following equation (5).

$$b_{TR} = b_{Response}/\Phi_{Response} \quad (5)$$

In one embodiment, the method of FIG. 4 is performed with an input signal applied to the phase reference device from 10 MHz oscillator in measurement system 100 and an output of phase reference device connected to "b" receiver 125. The output signal is varied from 10 MHz to 26.5 GHz, and measurements are performed at each 10 MHz interval to generate phase response data at 2650 points.

Figure 5:
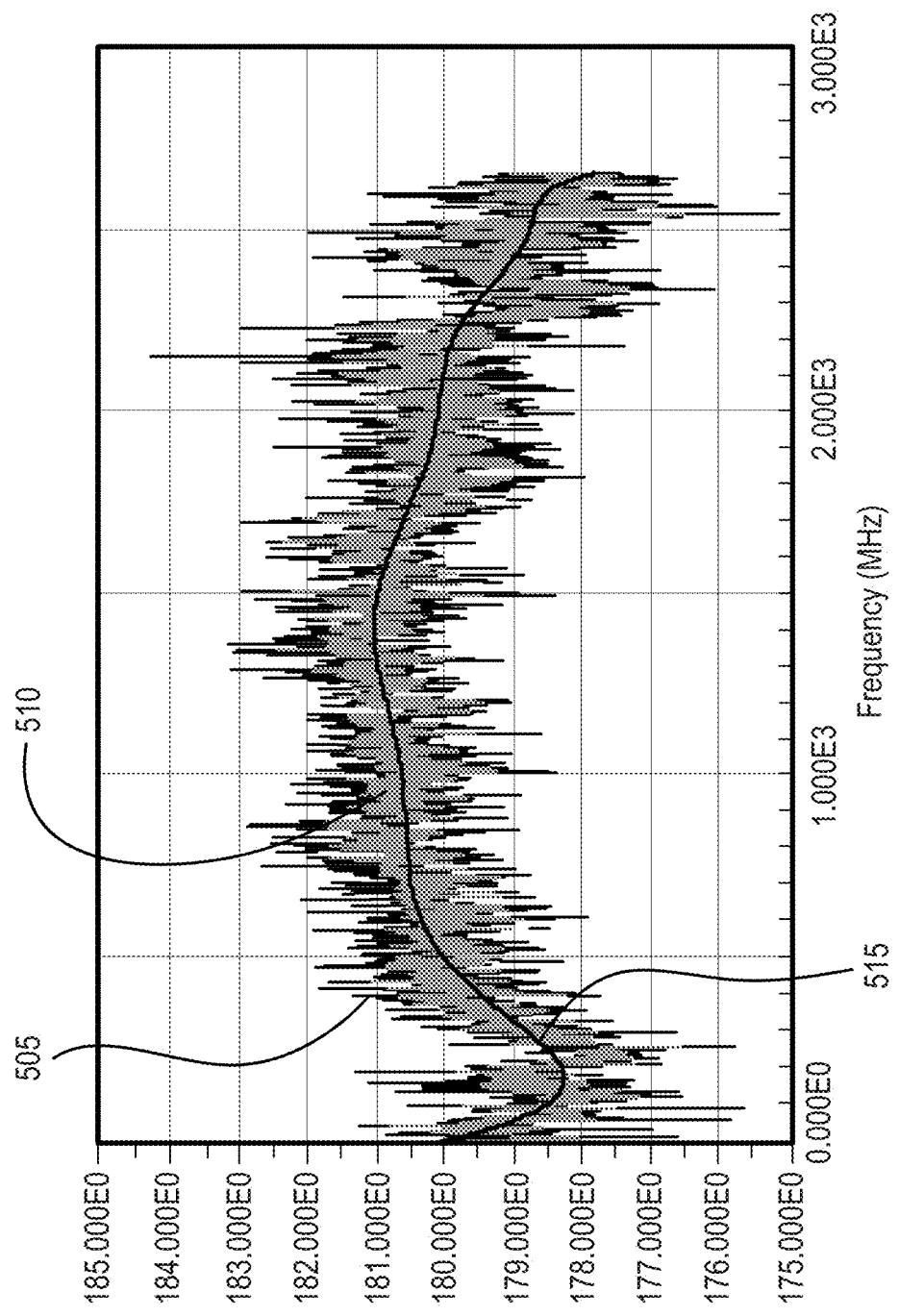
FIG. 5 is a graph illustrating a phase response of a phase reference device in accordance with a representative embodiment.

FIG. 5 illustrates a phase response of the phase reference device in accordance with a representative embodiment. In this example, the phase reference device is an Agilent U9391C comb generator. In FIG. 5, raw phase response measurements are indicated by data points 505 illustrated with a first type of shading. Smoothed phase response measurements are indicated by data points 510 illustrated with a second type of shading. Finally, a result of fitting the phase response measurements to a polynomial curve is indicated by a reference number 510. In this example, the raw measurements include a significant amount of noise, so smoothing the phase reference output can improve the results of using the method of FIG. 3.

Figure 6:
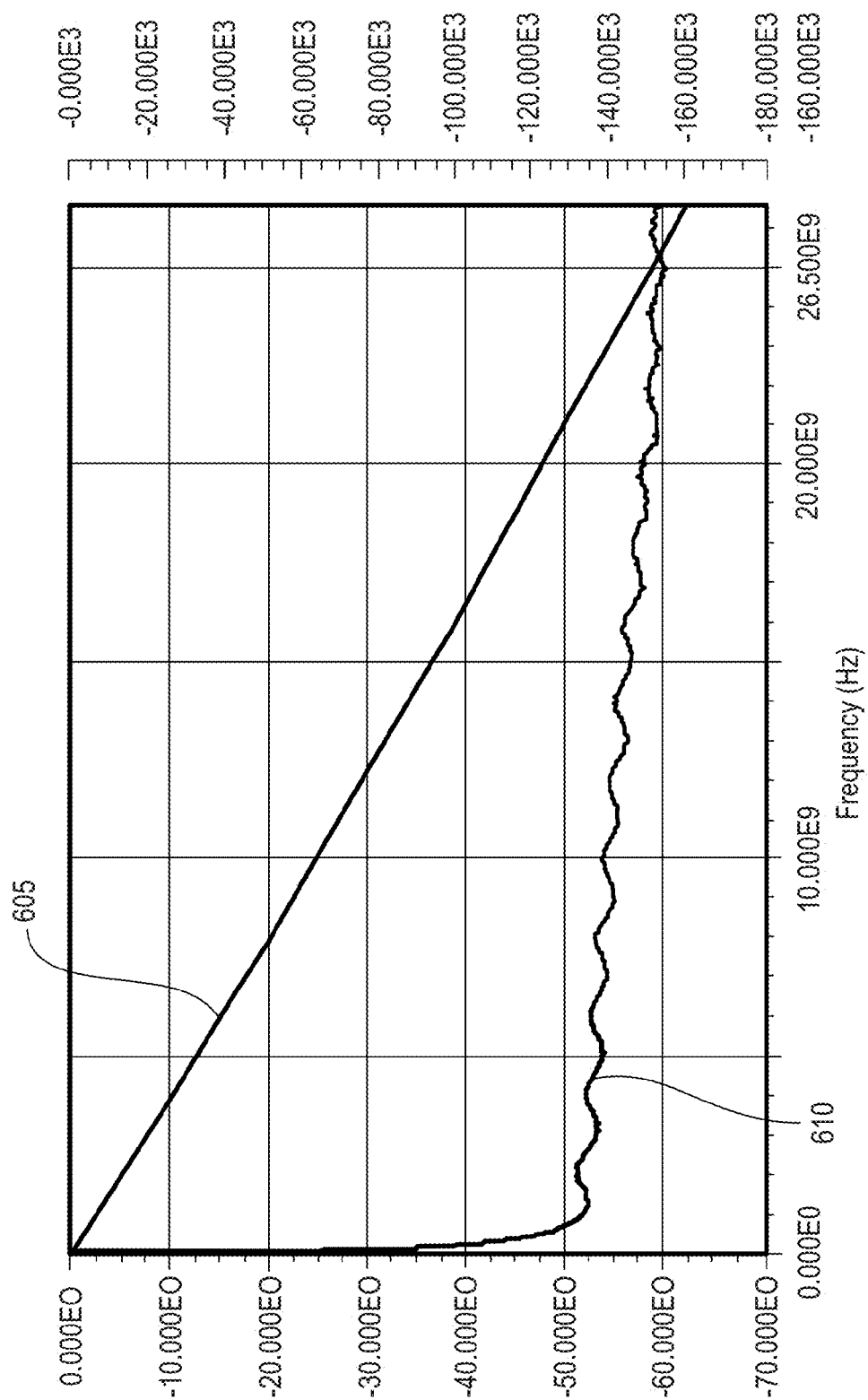
FIG. 6 is a graph illustrating a raw amplitude and phase response of a receiver driven by a phase reference device in accordance with a representative embodiment.

FIG. 6 is a graph illustrating a raw amplitude and phase response of "b" receiver 125 driven from the phase reference device in accordance with a representative embodiment. The raw amplitude and phase response illustrated in FIG. 6 represent a combination of the phase response of the phase reference device and the phase response of "b" receiver 125, including a directional coupler response in front of "b" receiver 125.

Referring to FIG. 6, "b" receiver 125 has a power response of approximately −50 to −60 dBm, as indicated by a curve 605, and a phase response going from 0 degrees to more than −160,000 degrees, as indicated by a curve 610. As such, it is more convenient to show the phase response in terms of either group delay or deviation from linear phase.

Figure 7:
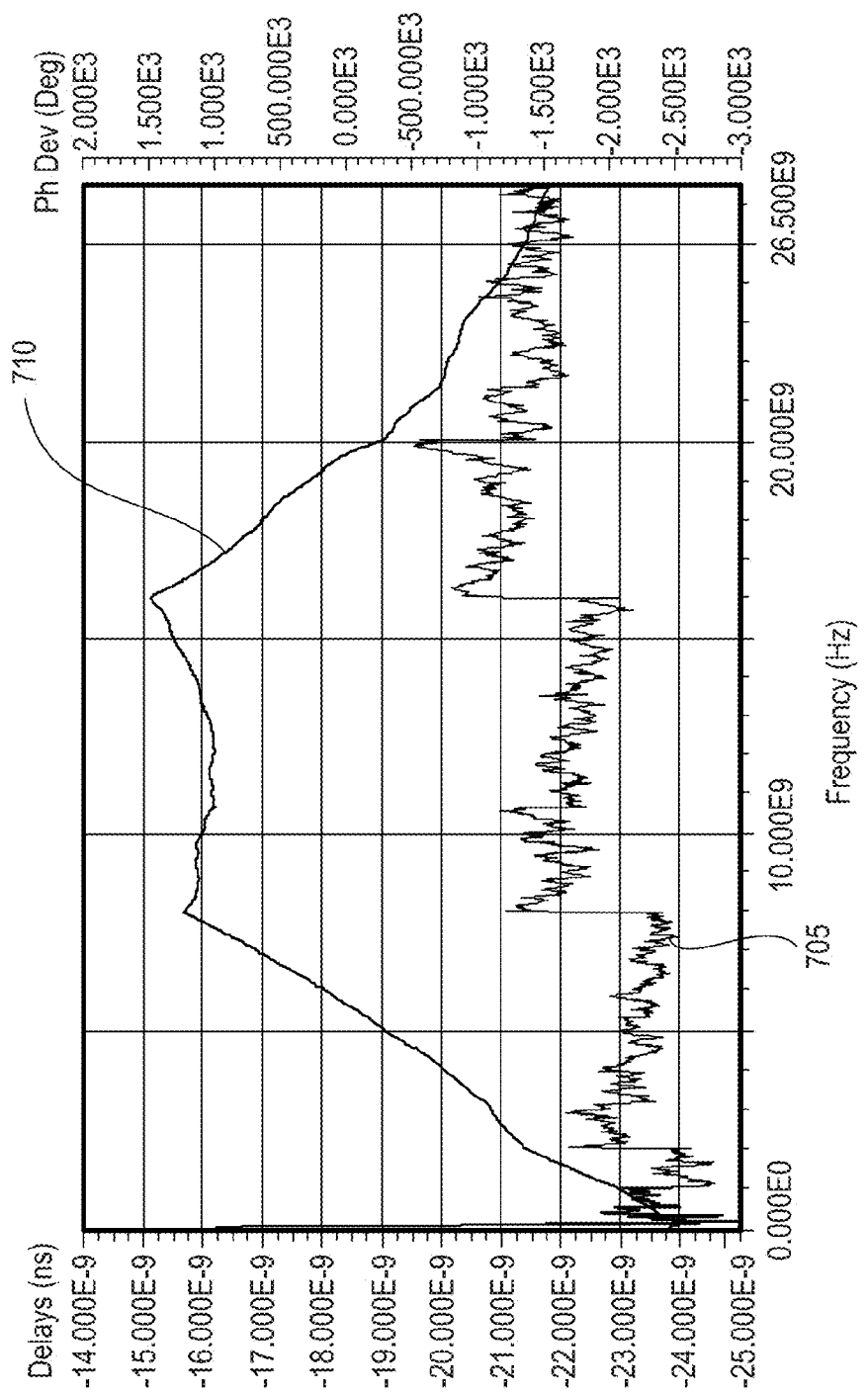
FIG. 7 is a graph illustrating phase deviation and group delay of a phase reference device and a receiver in accordance with a representative embodiment.

FIG. 7 is a graph illustrating phase deviation and group delay of the phase reference device and "b" receiver 125 in accordance with a representative embodiment. In FIG. 7, a curve 705 represents the phase deviation and a curve 710 represents the group delay.

The group delay of the phase reference device is very small and very flat across frequency, with a phase delay deviation less than 10 picoseconds. Accordingly, the delay response in FIG. 7, which has a mean value of −22 nanoseconds, is almost entirely due to the response of "b" receiver 125. Further, the fine grain response of the delay is commensurate with the amplitude response variation measured on "b" receiver 125.

The phase response of "b" receiver 125 is divided by the phase reference response $\Phi_{Response}$ of the phase reference device to produce tracking term $b_{TR}$, as described above. Thereafter, tracking term $a_{TR}$ is computed from tracking term $b_{TR}$ and tracking term S21(tracking) according to equation (4).

Figure 8:
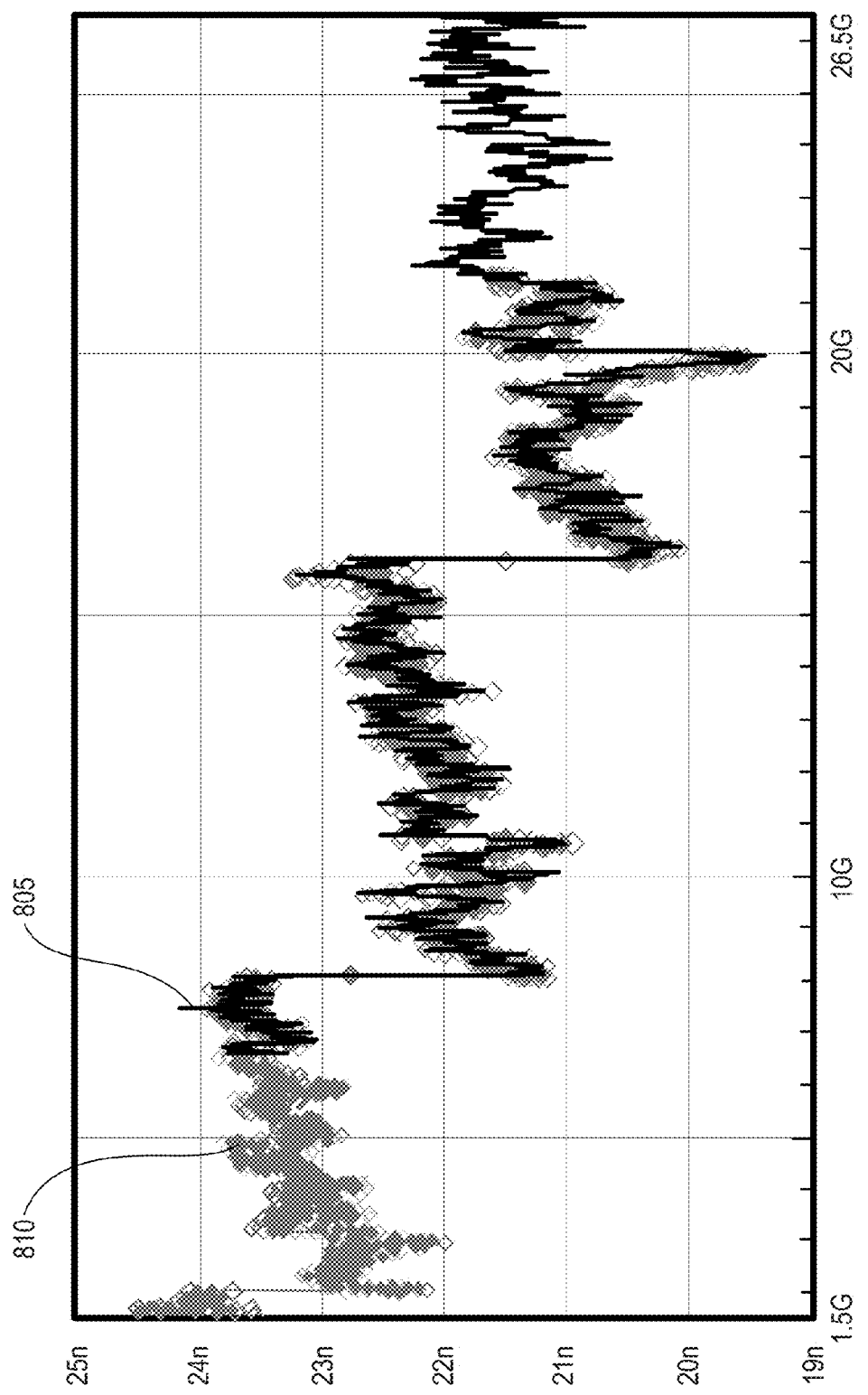
FIG. 8 illustrates phase tracking errors of a first receiver over an input frequency range and of a second receiver over an output frequency range as measured in accordance with a representative embodiment.

After the $a_{TR}$ and $b_{TR}$ are computed, the responses are segmented according to the input frequency range for the $a_{TR}$ and the output frequency range for the $b_{TR}$. FIG. 8 illustrates phase tracking errors of "a" receiver 115 over the input frequency range and "b" receiver 125 over the output frequency range as measured by the above process. In FIG. 8, a curve 805 represents phase tracking errors of "a" receiver 115, a curve 810 represents phase tracking errors of "b" receiver 125. As illustrated by FIG. 8, both curves have discrete jumps at the same frequency. This implies a common cause to the jumps in delay between the reference and test receivers. The common factor is a common LO used to drive both receivers. Because the phase response of the individual receivers is relatively flat, the response of a receiver can be computed for any frequency between the calibration points using interpolation. This removes any restriction that the measurements must be done on the same frequencies that the phase reference uses to calibrate.

Figure 9:
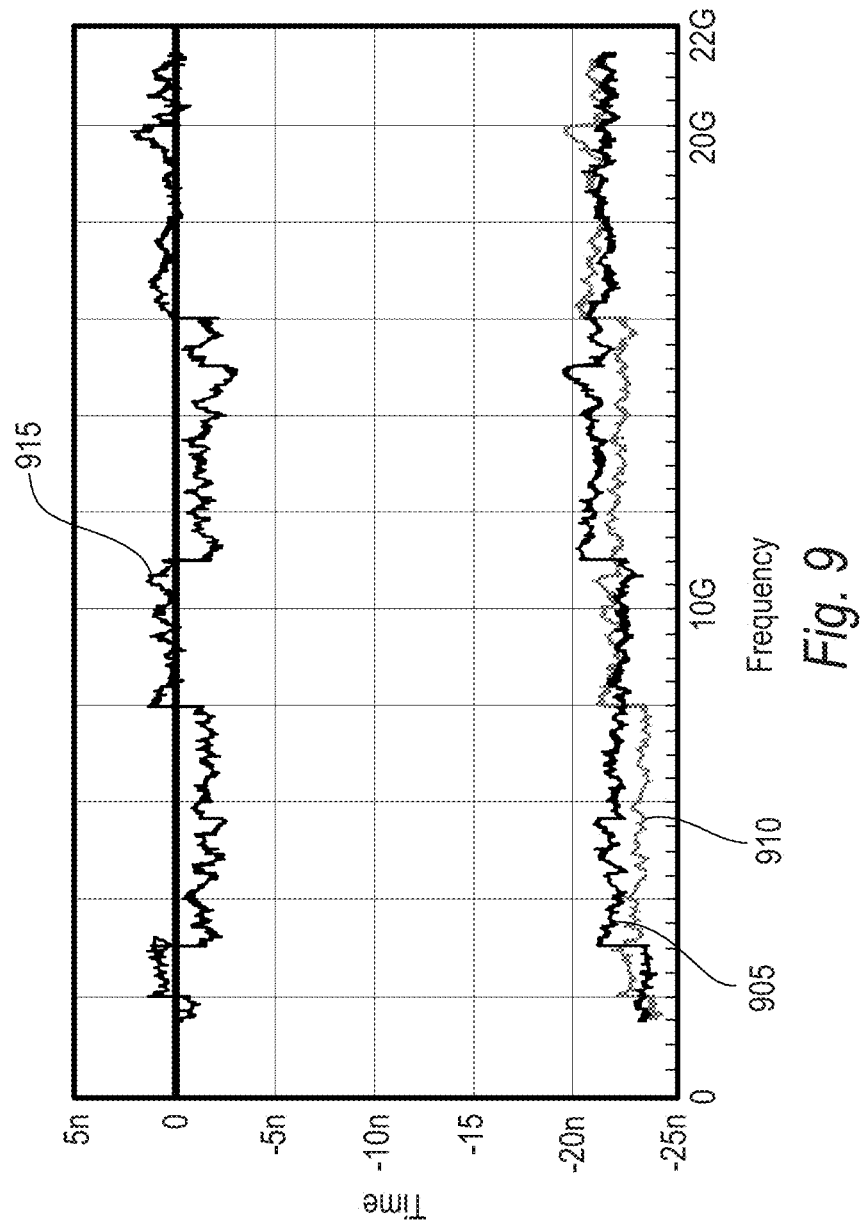
FIG. 9 a graph illustrating a tracking response of a first receiver and of a second receiver as a function of frequency in accordance with a representative embodiment.

FIG. 9 is a graph illustrating a tracking response of "a" receiver 115 and "b" receiver 125 as a function of frequency in accordance with a representative embodiment. In FIG. 9, a first curve 905 illustrates the tracking response of "a" receiver 115, and a second curve 910 illustrates the tracking response of "b" receiver 125, with the responses overlaid on so that the first point of 905 aligns with the first point of 910. Curve 915 represents the combined correction term of $a_{TR}/b_{TR}$. A mixer under test behaves according to the response of equation (2), so its phase response also contains any response from the LO. In the example of FIG. 8, the LO is created by multiplying and dividing a base 2-4 GHz oscillator. After each multiplication path is a filter, so it is reasonable to expect discrete changes at the multiplier bands, as shown in FIG. 8.

Figure 10:
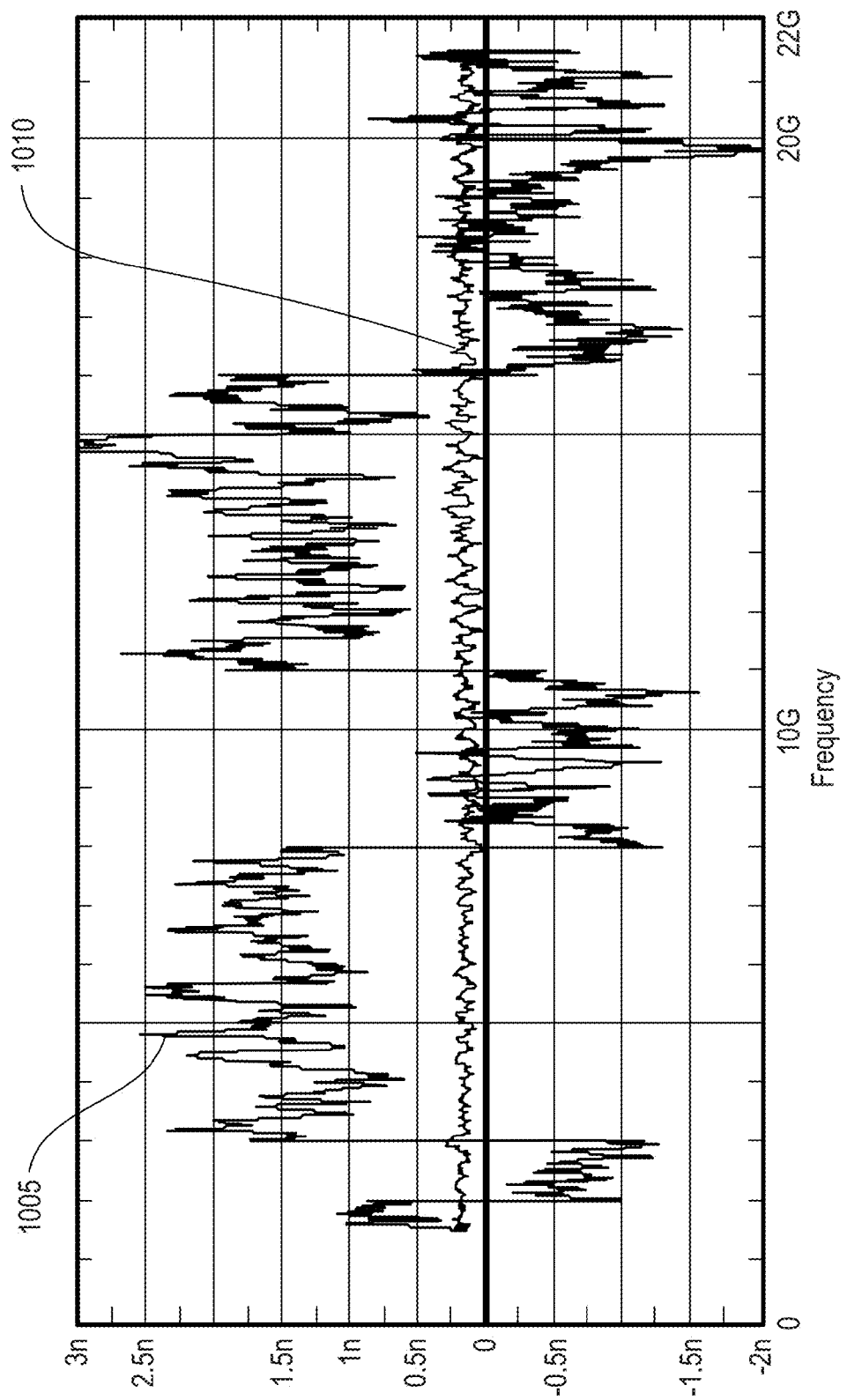
FIG. 10 is a graph illustrating a raw and corrected group delay response of a mixer in accordance with a representative embodiment.

FIG. 10 is a graph illustrating a raw and corrected group delay response of a mixer in accordance with a representative embodiment. In FIG. 10, a first curve 1005 indicates the raw group delay response, and a second curve 1010 indicates the corrected group delay response. The group delay response is corrected according to the tracking terms illustrated in FIG. 9 by curve 815.

In the example of FIG. 10, the mixer is corrected to a value of 250 picoseconds delay, with residual ripple of less than 50 picoseconds. This correction was performed without a calibration mixer and is similar to the results obtained by methods using a calibration mixer.

As indicated by the foregoing, the disclosed embodiments provide methods that do not require a calibration mixer or a reference mixer for measurement or correction. Moreover, certain embodiments use a phase reference device that can be traced to national standards labs, combined with traceable S-parameter and power calibration, to generate a traceable measurement of the phase response and group delay of a mixer. In certain embodiments, the calibration relies on a network analysis system that can make single receiver phase measurements. The calibration can be generalized to allow a single calibration of the system to measure any of a variety of mixer setups, including changing RF, IF and LO frequencies, provided the initial calibration covers all the frequency ranges. This embodiment uses a pulse generator as a phase reference, but any signal with a known phase response between frequency elements can be used as a phase reference.

In view of this disclosure it is noted that the methods and apparatuses can be implemented in keeping with the present teachings. Further, the various components, devices, configurations and parameters are included by way of illustration and example only and not in any limiting sense. In view of this disclosure, the present teachings can be implemented in other applications and components, devices, configurations, parameters and equipment useful in implementing these applications can be determined, while remaining within the scope of the appended claims.

What is claimed is:

1. A method of calibrating a network analysis system comprising a device measurement path located between a first receiver and a second receiver, the method comprising:

determining a phase response of the first receiver independent of the second receiver;

determining a phase response of the second receiver;

determining a phase tracking response from the phase response of the first receiver and the phase response of the second receiver to establish a calibration of the device measurement path;

measuring a raw phase response of a device using the first receiver; and modifying the raw phase response according to an actual phase response of the device, wherein modifying the raw phase response comprises dividing the raw phase response by the actual phase response of the device.

2. The method of claim 1, wherein the phase response of the second receiver is determined independent of the first receiver.

3. The method of claim 1, wherein modifying the raw phase response comprises dividing the raw phase response by the actual phase response of the device.

4. The method of claim 1, further comprising applying a smoothing function to the actual phase response prior to modifying the raw phase response.

5. The method of claim 1, wherein the device comprises a comb generator.

6. The method of claim 1, wherein interpolation is used to generate a phase response between measurement points of the measured raw phase response.

7. A method of characterizing a phase response of a receiver in a signal processing system, the method comprising:
measuring a phase response of a device using the receiver; and
modifying the measured phase response according to an actual phase response of the device to generate a phase tracking parameter of the receiver.

8. The method of claim 7, wherein interpolation is used to generate a phase response between measurement points of the measured phase response.

9. The method of claim 7, wherein the signal processing system comprises a vector network analyzer.

10. A network analyzer, comprising:
a signal source configured to supply an input signal to a device, wherein the device is configured to generate a phase reference signal;
a receiver configured to receive the phase reference signal from the device and to measure a phase response of the device according to the phase reference signal; and
a calibration component configured to compare the measured phase response of the device with an actual phase response of the device to identify a tracking parameter for the receiver.

11. The network analyzer of claim 10, wherein the device comprises a harmonic comb generator having a known phase response.

12. The network analyzer of claim 10, wherein the calibration component compares the measured phase response to the actual phase response by performing a division operation to generate the tracking parameter for the receiver.

13. The network analyzer of claim 10, further comprising a second receiver located on an opposite side of a device measurement path from the receiver, wherein the calibration component is further configured to identify a tracking parameter of the second receiver based on the tracking parameter of the receiver.

14. The network analyzer of claim 13, further comprising a device measurement component configured to determine a phase response of a frequency translating device using the tracking parameters of the receiver and the second receiver.

15. The network analyzer of claim 10, wherein interpolation is used to generate a phase response between measurement points of the measured phase response.

16. The network analyzer of claim 13, wherein the calibration component determines the tracking parameter of the second receiver by dividing the tracking parameter of the receiver by a tracking parameter of the device measurement path.

17. A method of calibrating a network analysis system comprising a device measurement path located between a first receiver and a second receiver, the method comprising:
determining a phase response of the first receiver independent of the second receiver;
determining a phase response of the second receiver;
measuring a phase response of a frequency translation device through the device measurement path; and
correcting the measured phase response of the frequency translation device according to a phase tracking parameter of the first receiver and a phase tracking parameter of the second receiver.

18. The method of claim 17 wherein the frequency translation device is a multi-stage frequency converter.

* * * * *